(12) United States Patent
Marioni

(10) Patent No.: US 7,911,109 B2
(45) Date of Patent: Mar. 22, 2011

(54) PERMANENT-MAGNET MONO-PHASE SYNCHRONOUS ELECTRIC MOTOR WITH IMPROVED STATOR STRUCTURE, IN PARTICULAR FOR DISCHARGE PUMPS OF WASHING MACHINES AND SIMILAR HOUSEHOLD APPLIANCES

(75) Inventor: Elio Marioni, Dueville (Vicenza) (IT)

(73) Assignee: Askoll Holding S.r.l. (IT)

( * ) Notice: Subject to any disclaimer, the term of this patent is extended or adjusted under 35 U.S.C. 154(b) by 0 days.

(21) Appl. No.: 11/466,982

(22) Filed: Aug. 24, 2006

(65) Prior Publication Data

US 2007/0052318 A1 Mar. 8, 2007

(30) Foreign Application Priority Data

Aug. 30, 2005 (EP) ..................... 05425606

(51) Int. Cl.
*H02K 1/00* (2006.01)
(52) U.S. Cl. ........................... 310/216.091; 310/216.092
(58) Field of Classification Search .................. 310/216.091–216.094, 218, 259
See application file for complete search history.

(56) References Cited

U.S. PATENT DOCUMENTS

| | | | | |
|---|---|---|---|---|
| 2,484,001 A * | 10/1949 | Raymond | ...................... | 310/254 |
| 3,933,536 A * | 1/1976 | Doser et al. | ................... | 148/105 |
| 3,949,251 A * | 4/1976 | Takatsuki | ..................... | 310/49 R |
| 4,528,533 A * | 7/1985 | Montagu | ........................ | 335/230 |
| 4,554,471 A * | 11/1985 | Bertram et al. | ............. | 310/49.33 |
| 4,577,129 A * | 3/1986 | Bertram | ......................... | 310/112 |
| 4,684,840 A * | 8/1987 | Bertram et al. | ................ | 310/162 |
| 4,755,699 A * | 7/1988 | Schmider | ..................... | 310/68 R |
| 5,627,423 A * | 5/1997 | Marioni | .................... | 310/156.23 |
| 5,898,253 A * | 4/1999 | El-Antably et al. | ........ | 310/261.1 |
| 6,057,621 A * | 5/2000 | Suzuki et al. | ............. | 310/156.12 |
| 6,404,090 B1 * | 6/2002 | Phillips et al. | ................. | 310/166 |
| 6,509,667 B1 * | 1/2003 | El-Antably et al. | ........ | 310/261.1 |
| 6,765,325 B1 * | 7/2004 | Prouvost | .......................... | 310/87 |
| 6,815,863 B1 | 11/2004 | Jack et al. | | |
| 6,972,502 B2 * | 12/2005 | Marioni | ....................... | 310/75 R |
| 7,045,922 B2 * | 5/2006 | Marioni | ........................... | 310/91 |
| 2002/0149282 A1 | 10/2002 | Heidrich | | |
| 2004/0155549 A1* | 8/2004 | Marioni | ......................... | 310/194 |
| 2005/0162034 A1 | 7/2005 | Soghomonian | | |

FOREIGN PATENT DOCUMENTS

EP 0 574 823 A2 12/1993
GB 568 395 A 4/1945

* cited by examiner

*Primary Examiner* — Burton Mullins
*Assistant Examiner* — Naishadh N Desai
(74) *Attorney, Agent, or Firm* — Akerman Senterfitt

(57) ABSTRACT

The invention regards a permanent-magnets mono-phase synchronous electric motor (7) for washing machines and the like, in particular for washing pumps (1), with improved stator (4) structure and of the type centrally comprising a permanent-magnets axial rotor (2) and a stator (4) with a lamination pack core (5) and a couple of pole pieces with ends enveloping the rotor (2), of which they have substantially the same axial length and from which they are spaced by respective aircore. Such a motor is distinguished in that the lamination pack core (5) has a shorter axial length with respect to the ends (10, 11) of said pole pieces.

Advantageously, the stator (4) pole pieces are obtained through moulding magnetic powders.

10 Claims, 5 Drawing Sheets

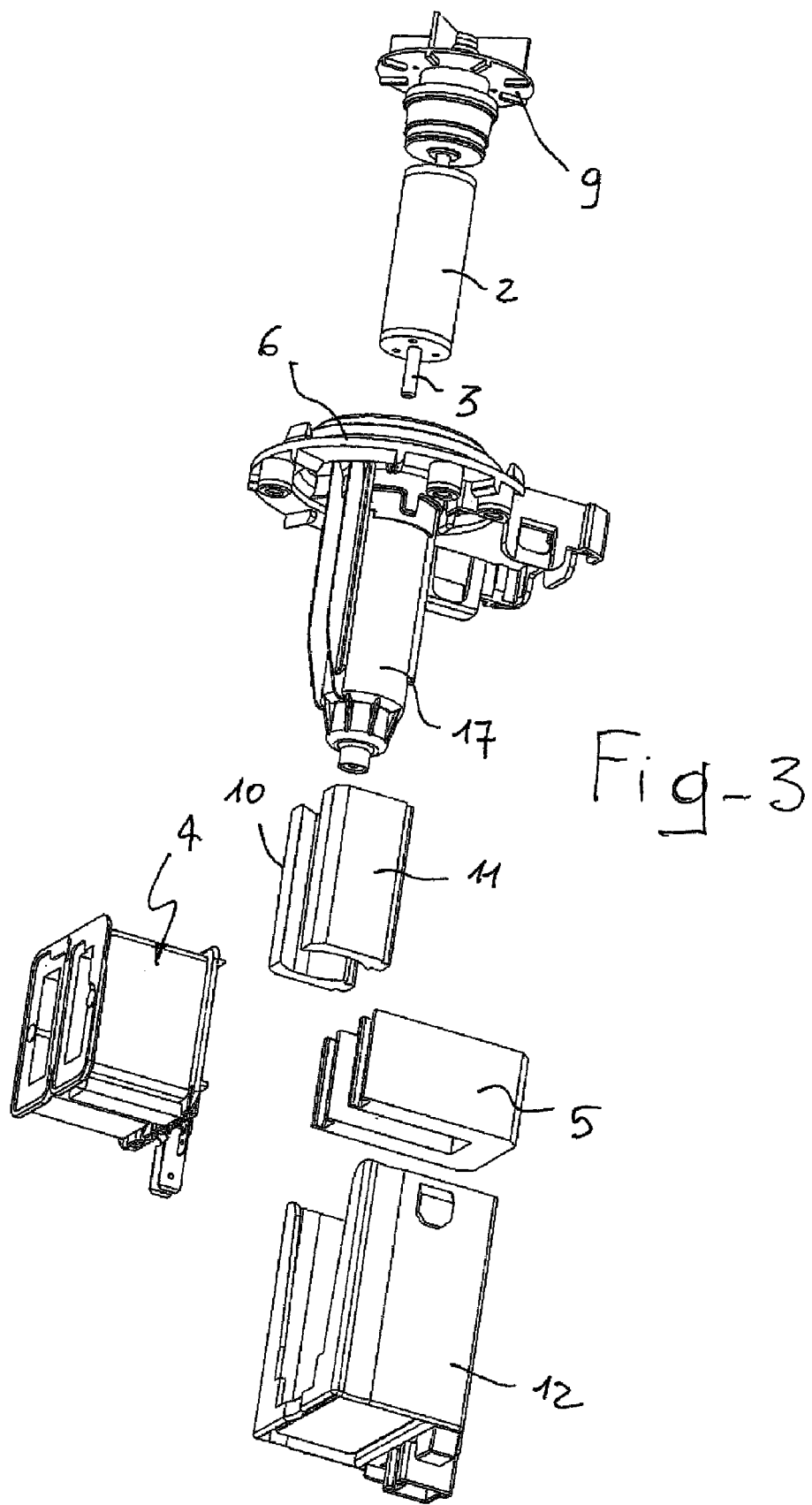

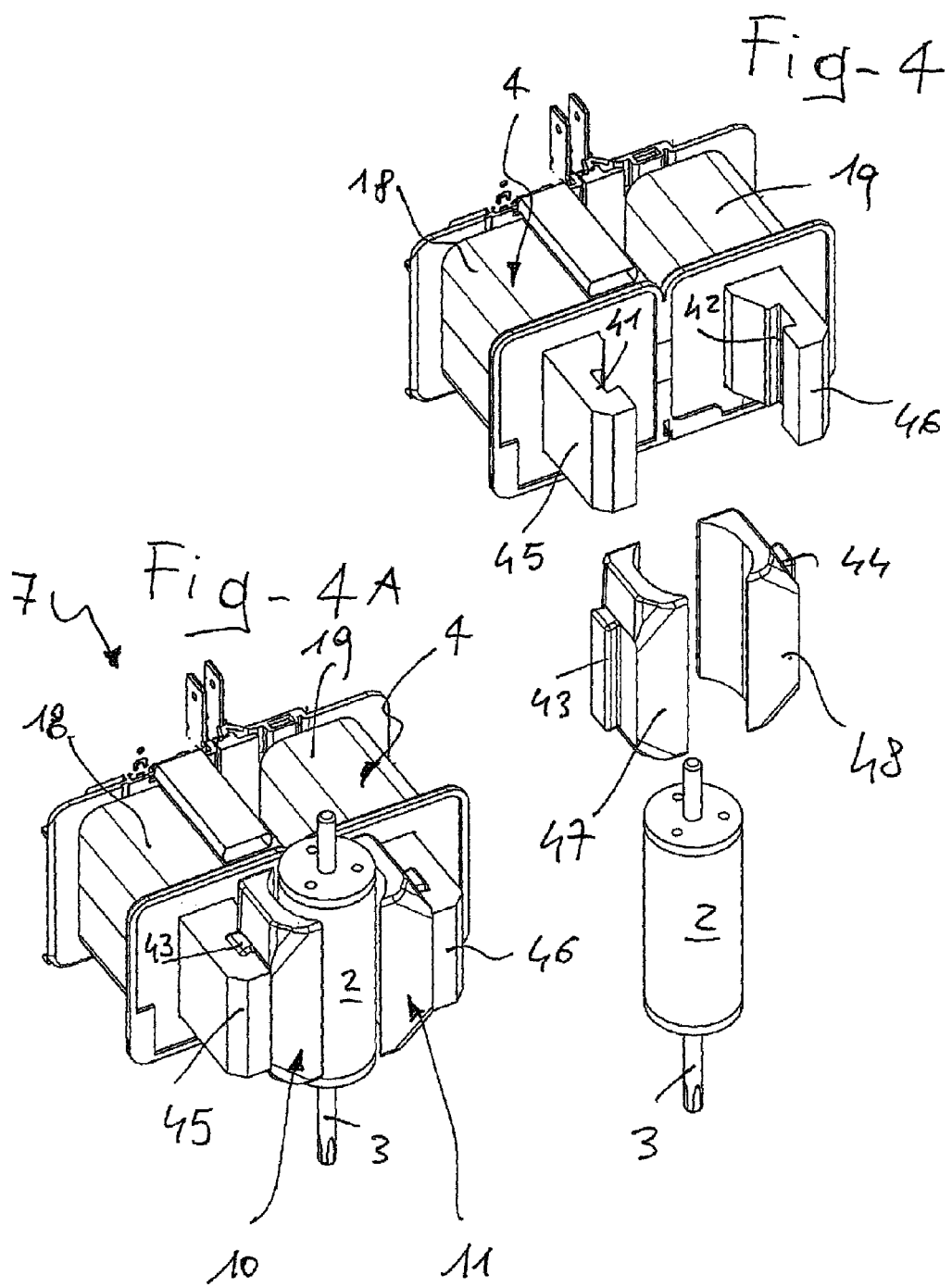

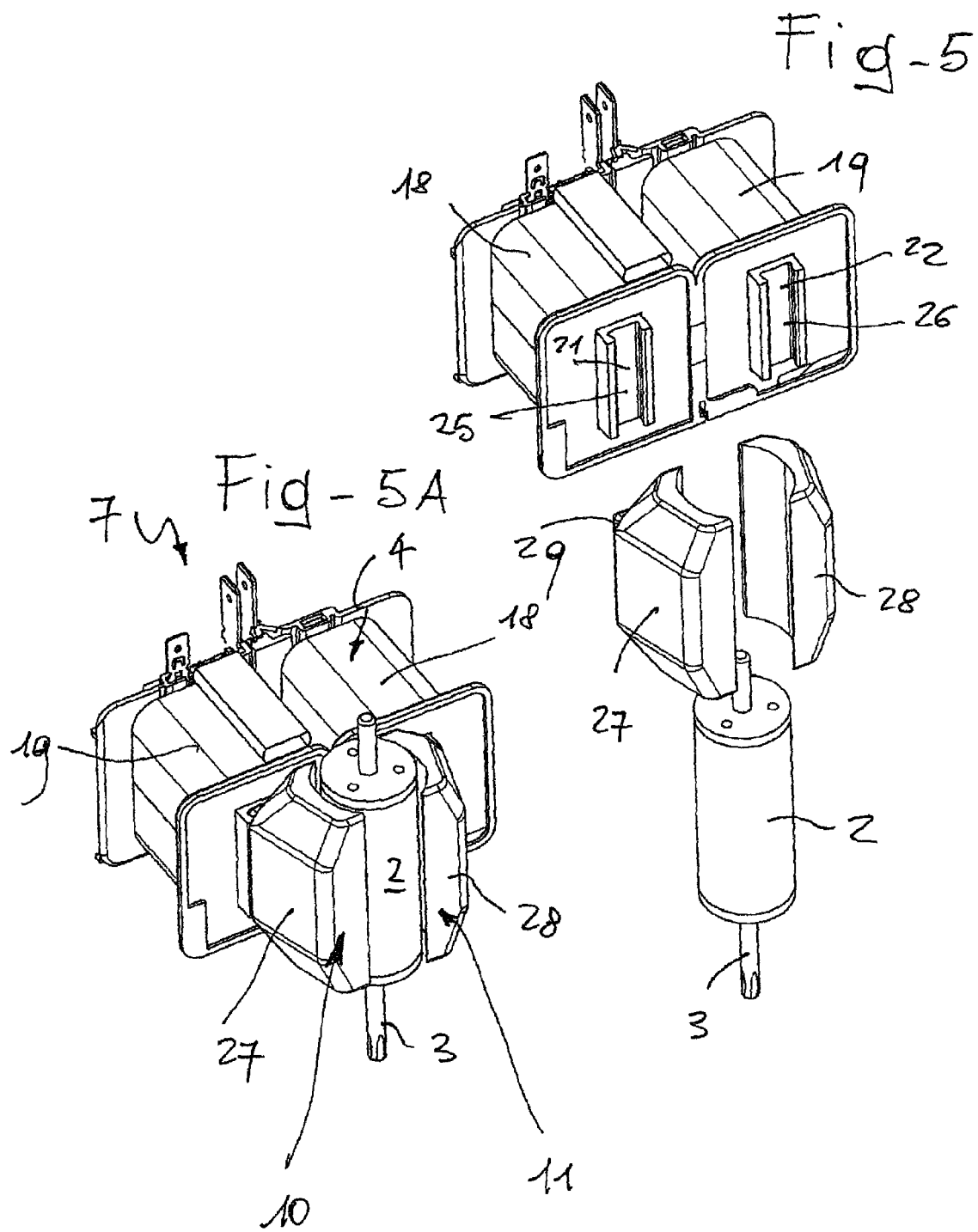

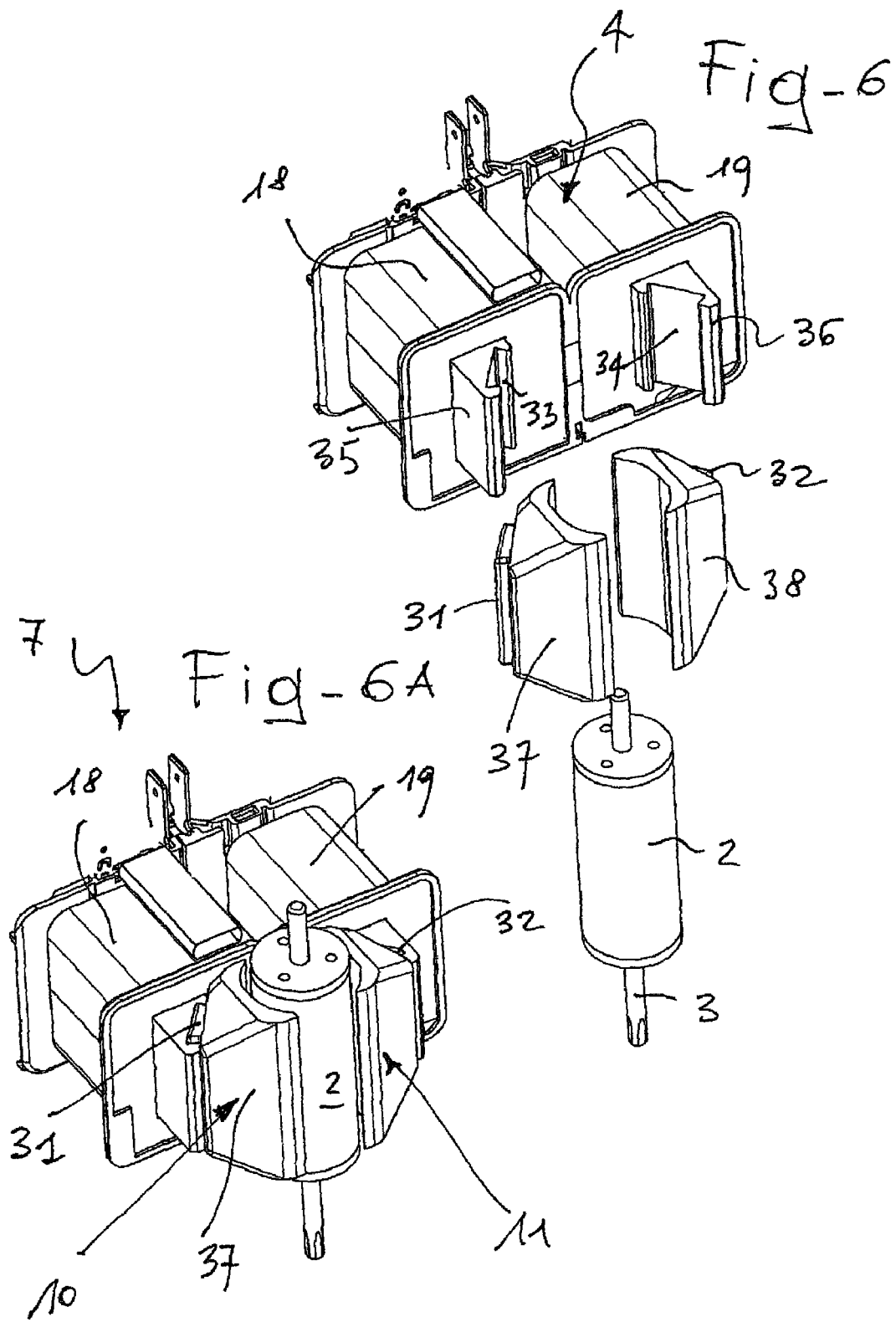

PERMANENT-MAGNET MONO-PHASE SYNCHRONOUS ELECTRIC MOTOR WITH IMPROVED STATOR STRUCTURE, IN PARTICULAR FOR DISCHARGE PUMPS OF WASHING MACHINES AND SIMILAR HOUSEHOLD APPLIANCES

FIELD OF APPLICATION

The present invention refers to a permanent-magnets mono-phase synchronous electric motor with improved stator structure, in particular for discharge pumps of washing machines and similar household appliances.

More in particular, the invention regards a motor of the aforementioned type and comprising a central permanent-magnets rotor, a stator with a lamination pack core and a couple of pole pieces enveloping said rotor, of which they have substantially the same length.

PRIOR ART

There is a need to realize discharge pumps for domestic devices, like washing machines, such as clothes washing machines, dishwashers and similar household appliances, which have the best possible hydraulic efficiency. Hydraulic efficiency is intended as the best ratio between the hydraulic condition available at the pump, such as the fluid flow or pressure, and the electrical power absorbed by the motor each pump is associated with.

It is also known that permanent-magnets synchronous motors, in particular mono-phase ones with a diapason or fork stator structure and a permanent-magnets rotor have a serious problem in the start-up step, when the motor passes from a condition of standstill to a condition in which the frequency is in phase with the frequency of the electrical supply network.

For example, if the electrical supply network has a frequency of 50 or 60 Hz, the rotor should reach the synchronism speed in a period of time equal to half the network wave period. This however is extremely difficult, in particular if the motor has a significant moment of inertia and must contrast the torque of a load associated with the rotor.

To avoid this drawback various solutions have already been adopted both of electronic and mechanical nature.

For example, in the European Patent No. EP-0574823, to the same Applicant, the synchronous electric motor is equipped with an electronic start-up device which allows the gradual starting of the motor by applying the current and voltage vectors to the stator windings with appropriate phase shifts.

For this aim the position of the rotor is also detected by means of a position sensor which transmits the information to the electronic monitoring device, which decides whether or not to apply the electrical power to the stator windings, through a power switch, depending on the polarity of the electrical power source in each given instant, thus generating the most appropriate magnetic flux for the start-up step. This flux, interacting with the magnetic flux generated by the rotor, produces a torque capable of accelerating the rotor in a specific rotation direction until the synchronism speed with the electrical supply source is reached and maintained.

Nevertheless, such electronic start-up devices applied to mono-phase motors have a rather high cost, both of production and of application to the motor.

Such cost represents an obstacle not yet overcome which prevails over the need to optimise the energetic efficiency and substantially impedes the use of the pump of the above-specified type on washing machines of domestic use but belonging to the economic machines category.

On these machines it is preferred to use mono-phase synchronous motors with start-up devices of purely mechanical type. These motors generally have a lower efficiency and greater noise in operation. The rotor of these types of motors is realised with permanent magnets and the stator comprises a lamination pack core which has only two stator pole pieces and consequent windings.

This stator structure enjoys the advantage of being simple to realise and of relatively low cost. Nevertheless, the present needs to limit production costs make also the mono-phase synchronous pumps realised with this stator structure surprisingly expensive.

The technical problem underlying the present invention is that of devising a permanent-magnets synchronous electric motor, in particular for discharge pumps of washing machines, having such structural and functional characteristics as to allow an easy start-up together with a structure of particular simplicity which allows its manufacturing at considerably lower costs than the solutions presently proposed by the prior art.

SUMMARY OF THE INVENTION

The solution idea underlying the present invention is that of providing the assembly of the stator group core by means of a lamination pack having an axial length shorter than the axial length of the corresponding ends of the pole pieces.

Advantageously, such ends of the pole pieces are associated with the lamination pack in a removable or in any case structurally independent way.

In accordance with such solution idea, said ends of the pole pieces are realised through moulding starting from magnetic powders microencapsulated by electrically insulating substances.

The technical problem of the present invention is resolved by a motor as previously indicated, having a permanent-magnet rotor and a stator with a lamination pack core and a couple of pole pieces with ends enveloping the rotor. The ends of the pole pieces have substantially the same axial length as the rotor, from which they are spaced by an aircore. The lamination pack core .has a shorter axial length than the ends of the pole pieces.

The characteristics and advantages of the mono-phase motor according to the invention will be apparent from the following description of an embodiment, given by way of indicative and non limiting example with reference to the attached drawings.

BRIEF DESCRIPTION OF THE DRAWINGS

FIG. 3 shows a perspective and schematic view with detached parts of the pump of FIG. 1, with all of its component parts illustrated;

FIGS. 4 and 4A show respective perspective and schematic views of the electric motor according to the invention, with detached parts and in assembled form;

FIGS. 5 and 5a show respective perspective and schematic views of a further embodiment of the electric motor according to the invention, with detached parts and in assembled form;

FIGS. 6 and 6a show respective perspective and schematic views of a further embodiment of the electric motor according to the invention, with detached parts and in assembled form.

DETAILED DESCRIPTION

Figure 1:
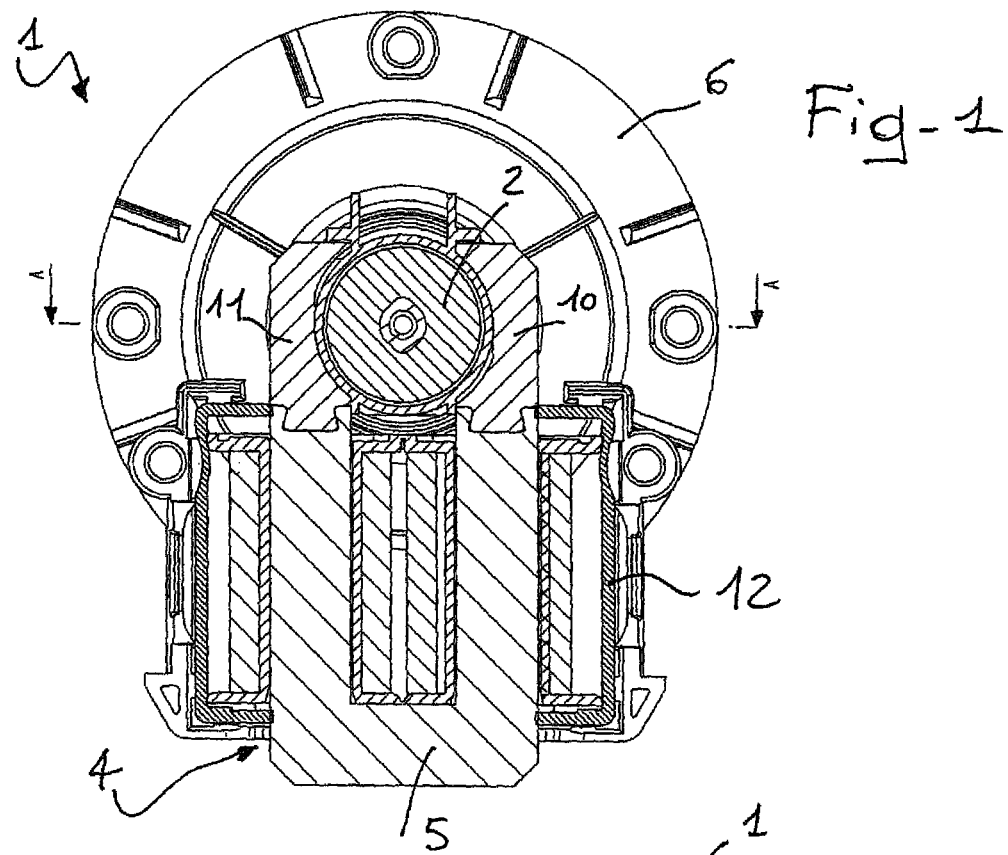
FIG. 1 shows a schematic view, in cross section, of a discharge pump incorporating a synchronous electric motor according to the present invention.
Figure 2:
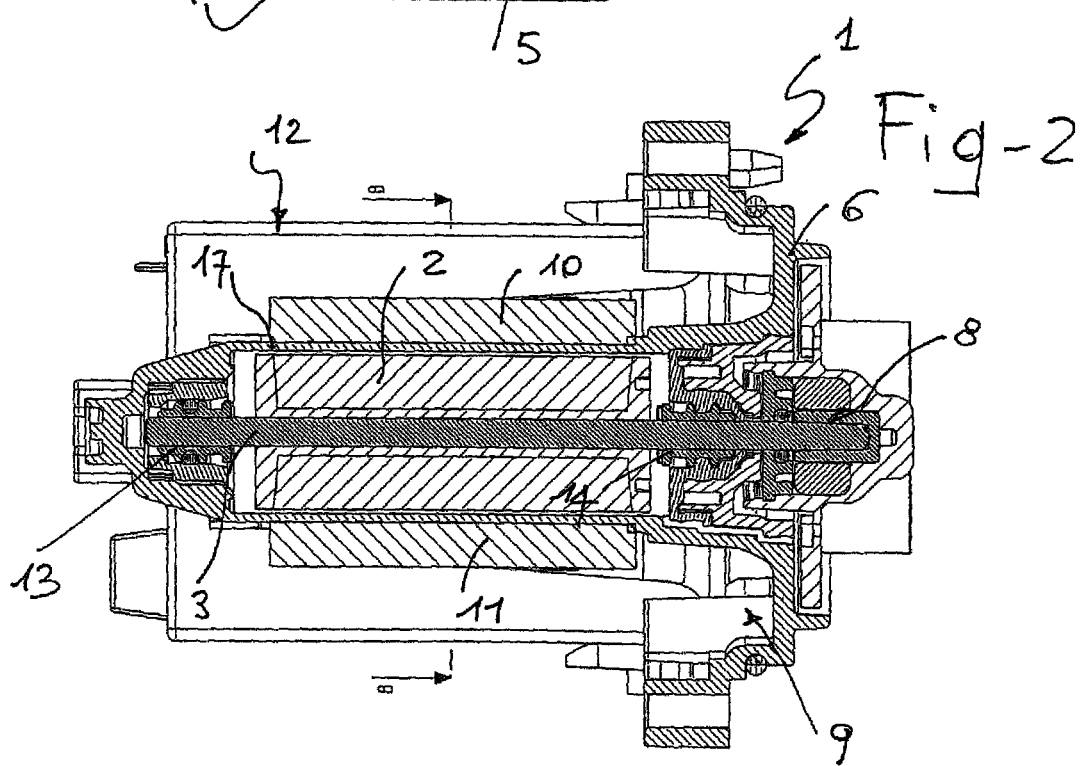
FIG. 2 shows a schematic view, in longitudinal section, of the discharge pump of FIG. 1.

With reference to such figures, 7 globally and schematically indicates a mono-phase synchronous electric motor realised in accordance with the present invention for the operation of a synchronous discharge pump 1 to be mounted preferably on washing machines such as washing machines and dishwashers, not shown in the drawings since they are of conventional type.

The motor 7 has a permanent-magnets central rotor 2 and a stator 4 comprising a lamination pack core 5 with a couple of pole pieces 10, 11, enveloping the rotor 2 and from which they are spaced by respective aircore.

The rotor 2 has a longitudinal axis x-x which coincides with the axis of a rotation shaft 3 which is supported by opposite bearings 13, 14.

The rotor 2 is tightly insulated with respect to the stator 4 by an essentially tube-shaped envelope 17 integrally formed with a flange-like portion 6 intended to be coupled on one side with a volute, not represented since conventional, of the pump 1 and on the other side with a envelope 12 covering the stator 4 of the pump 1.

As it is well known to the skilled in the art, the motor 7 is intended to activate the operating gear, i.e. an impeller 9 enclosed within the coil of the pump 1.

The coupling between the impeller and the end of the driving shaft 3 is obtained by means of a kinematic joint 8, for example as described in the European Patents No. 0 287 984 and No. 0 983 630 to the same Applicant.

As already said, the motor 1 comprises a stator 4, with related lamination pack core 5 and stator windings 18, 19, as well as ends 10, 11 of stator pole pieces.

The stator 4 conventionally comprises a plurality of metallic laminations arranged as a pack to form the core 5 and stator windings 18, 19 adjacent to each other and having terminal ends defining two pole pieces 10, 11 being diapason-like arranged around the rotor 2.

More in particular, the core 5 is realized with packs of cut laminations having a substantially U-like form in plan view. Such laminations are obtained from the same plate band in order to reduce production losses and they are stacked to form core 5 which is thus also a U-like shape.

The stator windings 18, 19 are realized on respective coil bobbins which are then placed on the two U-shaped prongs of the lamination pack core 5 and the pole pieces thus obtained are brought together to form a structure with ends 10 and 11 of the pole pieces enveloping the rotor 2, as shown in FIGS. 4A, 5A and 6A.

Advantageously, according to the invention, the assembly of the core 5 of the stator group is obtained by means of a pack of laminations having axial length shorter than the axial length of the corresponding ends 10, 11 of the pole pieces.

Still more advantageously, such ends 10, 11 of the pole pieces are associated with the lamination pack core 5 in a removable way or in any case so as to be structurally independent therefrom.

In other words, the ends 10, 11 of the pole pieces are associated with each corresponding end of the prongs of the U-like lamination pack core with a substantially mortise and tenon coupling.

This is made possible by the fact that said ends 10, 11 of the pole pieces are realised through moulding starting from magnetic powders being microencapsulated and insulated by dia-magnetic or electrically insulating substances. Herafter the ends 10, 11 thus realised will be also called with the term SMC elements (Soft Magnetic Composite).

In substance, the size of the core 5, whereon the stator windings 18, 19 are provided, is unconstrained from the size of the pole pieces 10, 11, facing the permanent magnets of the rotor 2.

The aforementioned shorter axial length of the lamination pack core 5 is between 25% and 50% and preferably approximately 40% lower than that of the pole pieces 10, 11.

Surprisingly, this characteristic of the present invention does not worsen the steady performances of the synchronous motor, but, above all, it does not worsen the performances at the breakaway, i.e. at the start-up step, which are the most critical aspect of this type of motors, as it will be described in greater detail hereafter.

Overall, from experimental tests carried out by the Applicant, it has emerged that with equal breakaway voltage, the times and modes of motor starting according to the present invention respect the specifications of a synchronous motor having a stator of conventional structure while presenting a considerable cost saving in the stator structure.

FIGS. 4, 5 and 6 show the coupling modes between the ends 10, 11, obtained through molding of the stator pole pieces, and the corresponding ends of the prongs of the U-like lamination pack core 5.

For example, FIG. 5 shows an embodiment wherein the ends 21 and 22 of the two prongs of the U-like lamination pack core 5 have respective mortise slots 25, 26, or alternatively dovetail-like slots, to receive a corresponding tenon 29 integrally formed in each SMC element 27 or 28.

The conformation of the SMC elements which form the ends 10 and 11 of the pole pieces in the example of FIG. 5 was obtained through moulding the aforementioned magnetic powders so as to obtain a hollow portion, partially enveloping the rotor 2 and a side appendage defining the tenon 29.

Obviously, nothing prohibits that the modes of shape coupling are of different or double type on one of said matching ends or the other.

For example, FIGS. 4 and 4A show a different coupling conformation between the ends 45, 46 of the prongs of the U-like lamination pack core 5 and the SMC elements which, in this example, have been indicated with numbers 47 and 48.

The ends 45, 46 of the prongs provide respective mortise or dovetail-like slots 41, 42 facing each other and turned towards the rotor 2.

Each of the SMC elements 47, 48 has instead a respective tenon appendage 43, 44 integrally formed through molding on the opposite side with respect to the concavity turned towards the rotor 2.

In a similar way, the example of FIGS. 6 and 6A shows a further embodiment wherein the ends 35, 36 of the prongs of the U-like lamination pack core 5 are inclined and flared with respect to the a symmetry plane ideally passing through the rotor axis and separating the two windings 18, 19 from each other.

Also in this case such ends 35, 36 have respective mortise or dovetail-like slots 33, 34 turned towards the rotor 2.

Respective tenon appendages 31, 32 are provided being integrally formed through molding in the SMC elements indicated with numbers 37 and 38 which represent in the example of FIGS. 6 and 6A the ends 10 and 11 of the stator pole pieces.

In all the preceding embodiments, the axial length of the lamination pack core 5 essentially coincides with the axial length of the tenon appendages 29, 31, 32, 43, 44 of the SMC elements, all of which, on the other hand, have a prismatic body of greater axial length.

It should also be noted that a shorter axial length of the lamination pack core 5 implies, as a consequence, a smaller section of the support bobbins of the windings 18, 19. Consequently, there is the possibility to increase the number of turns, being the copper worn out identical, due to the smaller perimeter of each turn.

Without entering into elaborate theoretical treatments, it is worth noting that with the motor of the present invention a greater specific power is obtained with losses being equal. More in particular, if we compare a synchronous motor of traditional structure and the motor of the present invention, network supply frequency, torque delivered and stator and coil geometry being equal, it has been found, from experimental tests, that the current and losses depend on the V/N ratio (supply voltage per turn) and are approximately quadratically proportional.

The supply voltage is bound to the breakaway voltage according to a ratio well-defined within project specifications and normally greater than 1.1. The voltage applied to the input terminals is generally distributed in a drop ΔVr on the resistance of the coil Ra, a drop ΔVd on the dispersion inductance Ld, i.e. linked to the whole magnetic flux which does not interconnect the rotor 2, and an electromotive force Vi on the armature reaction inductance Li related to the useful magnetic flux which interconnect the magnet and produces torque.

From here the vectorial relation in complex field:

$$Va = \Delta Vr + \Delta Vd + Vi$$

The maximum number of turns must be appropriately low so as to guarantee the desired breakaway voltage. But since the losses depend on the V/N ratio, it follows that the losses and the nominal voltage heating will be considerably greater than what may be conveniently realised if the supply voltage were not bound to the breakaway one and the motor were optimised for the maximum electrical efficiency.

From the preceding relation it results instead that the components ΔVr and ΔVd decrease the voltage actually available to create torque, both during the breakaway transient and under synchronous conditions. In the motor according to the invention the effect of the voltage drop has been substantially minimised through the reduction of the respective parameters Ra and Ld and there is the possibility to increase the number of turns while maintaining the value of the breakaway voltage constant.

Still due to the V/N ratio, the greatest turns of the windings 18, 19 thus determined and the simultaneous section reduction lead to a lower voltage per turn and therefore lower losses during regular operation.

The motor according to the invention has the great advantage of being of an unusual structural simplicity combined with a production cost much lower than that of the current alternative solutions of the known art.

Further advantage is given by the fact that the size and shape of the stator pole pieces are unconstrained from the size of the lamination pack core they are associated with.

Finally, it is also to be noted that the reduced number of connections make the mounting simpler and more reliable and improve the overall efficiency.

The invention claimed is:

1. An electric motor for discharge pumps of washing machines and household appliances, comprising:
    a permanent-magnet rotor; and
    a stator comprising a lamination pack core, stator windings and a couple of pole pieces with ends enveloping said rotor;
    wherein the ends of said pole pieces have substantially the same axial length as said rotor, from which they are spaced by an aircore;
    wherein said lamination pack core has a shorter axial length than the ends of said pole pieces;
    wherein said stator windings have a shorter axial length with respect to the ends of said pole pieces; and
    wherein the motor is a permanent-magnet mono-phase synchronous electric motor.

2. The electric motor according to claim 1, wherein said ends of said stator pole pieces are obtained through molding magnetic powders.

3. The electric motor according to claim 2, wherein said magnetic powders are microencapsulated and insulated by diamagnetic material.

4. The electric motor according to claim 1, wherein said ends of said pole pieces are structurally independent and removably coupled to the lamination pack core.

5. The electric motor according to claim 2, wherein the lamination pack core is obtained by stacking a group of lamination portions having a U-like shape with the prongs of the U-like shape extending towards the rotor, and wherein support bobbins for stator windings are placed on said prongs to form said stator pole pieces, and wherein the ends of the prongs are joint-like coupled to said ends of said stator pole pieces.

6. The electric motor according to claim 5, wherein the joint-like coupling between the ends of the prongs and the corresponding ends of said stator pole pieces are obtained with simple mortise and tenon shape couplings.

7. The electric motor according to claim 1, wherein said shorter axial length ranges from 25% to 50%.

8. The electric motor according to claim 1, wherein said shorter axial length is 40%.

9. The electric motor according to claim 6, wherein the tenon element is formed integrally in one piece in the molding of said ends of said pole pieces.

10. An electric motor, for discharge pumps of washing machines and household appliances, comprising:
    a permanent-magnets rotor; and
    a stator comprising a lamination pack core, and a couple of pole pieces with ends enveloping said rotor;
    wherein said ends of said pole pieces have substantially the same axial length as said rotor, from which they are spaced by an aircore;
    wherein said lamination pack core has a shorter axial length with respect to the ends of said pole pieces; and
    wherein the motor is a permanent-magnet mono-phase synchronous electric motor with a start-up device of purely mechanical type.

* * * * *